United States Patent
Larson

[19]

[11] Patent Number: 5,948,303
[45] Date of Patent: Sep. 7, 1999

[54] TEMPERATURE CONTROL FOR A BED

[76] Inventor: Lynn D. Larson, 5410 NW. 44th St., Lincoln, Nebr. 68524

[21] Appl. No.: 09/072,299

[22] Filed: May 4, 1998

[51] Int. Cl.$^6$ .................................................. H05B 1/02
[52] U.S. Cl. ...................... 219/486; 219/518; 219/217; 219/494; 219/496; 5/421; 126/205
[58] Field of Search .................... 219/217, 518, 219/497, 494, 200, 496; 5/421; 126/205; 340/573

[56] References Cited

U.S. PATENT DOCUMENTS

| | | | |
|---|---|---|---|
| 4,132,262 | 1/1979 | Wibell | 165/26 |
| 4,359,626 | 11/1982 | Potter | 219/490 |
| 4,423,308 | 12/1983 | Callaway et al. | 219/217 |
| 4,549,074 | 10/1985 | Matsuo | 219/505 |
| 4,633,062 | 12/1986 | Nishida et al. | 219/212 |
| 4,700,046 | 10/1987 | Fristedt | 219/202 |
| 4,814,583 | 3/1989 | Rainey | 219/494 |
| 5,332,884 | 7/1994 | Bailey | 219/212 |
| 5,771,514 | 10/1998 | Wilhoit | 5/644 |
| 5,811,765 | 9/1998 | Nakagawa et al. | 219/497 |

*Primary Examiner*—Mark Paschall
*Attorney, Agent, or Firm*—Zarley, McKee, Thomte, Voorhees & Sease; Dennis L. Thomte

[57] ABSTRACT

A temperature control apparatus for a bed includes at least one heating element, mounted in a resting surface on a mattress of the bed for warming at least a first are(a of the resting area. A temperature sensor is located to detect the temperature of the first area of the resting area, and transmits the information to a central control unit. The central control unit includes a central processing unit which is interconnected with both the heating element and the temperature sensor to adjust the temperature in the first, area of the resting area as desired. The central control unit is also connected to a timer to permit programming of temperature changes as desired. An occupant sensor in the resting surface of the mattress will detect the presence and absence of an occupant, and transmit this information to the central control unit for processing.

10 Claims, 1 Drawing Sheet

TEMPERATURE CONTROL FOR A BED

TECHNICAL FIELD

The present invention relates generally to a temperature controller for various types of beds and more particularly to a heating apparatus for a mattress which is capable of varying the temperature in regions of the mattress according to time, temperature, or other parameters.

BACKGROUND OF THE INVENTION

Waterbed heaters typically consist of solid resistance wires or etched aluminum resistance elements which have been embedded or imprinted in a flat flexible mylar mat and sealed in a protective PVC sheath. Generally, the resistance elements are laid out in a serpentine pattern throughout the mat. These waterbed heaters are provided to heat and maintain the liquid in the flotation mattresses at a desired temperature.

Typically, waterbed heaters are arranged in flat engagement between the mattress support platform of the waterbed, and the bottom wall of the liquid filled bladder which forms the mattress. A control is provided to manually adjust the temperature of the liquid in the mattress, utilizing a small temperature sensing device, such as a thermocouple or thermistor, at the free end of a thin elongated flexible conductor. The conductors extend from the control unit between the bed platform and a mattress to locate the temperature sensor in engagement with the mattress spaced from the heater.

While temperature control is a continuous concern with waterbeds, temperature control also is an important aspect of conventional beds, and other fluid filled mattresses, such as air beds. Similarly, the temperature control for any of these types of beds need not be necessarily located between the bed support and the fluid filled mattress, but may be located on top of the mattress, between the bed occupant, and the mattress. An effective apparatus for accomplishing this type of heater utilizes a pillow top assembly connected to the top surface of the mattress. The heating unit may then be embedded within the pillow top assembly, or connected to the upper or lower surface of the pillow top assembly, to provide warmth to the bed occupant on top of the pillow top assembly.

Sleep research shows that a warm bed can promote sleep efficiency. However, body heat of the bed occupant will raise the bed temperature. This raise in bed temperature is typically not detected by conventional thermostats on conventional heating apparatus. If the bed temperature is too warm, undesirable sleep stage changes may occur.

One stage of sleep is identified as REM (rapid eye movement) sleep. An increased bed temperature cannot only be uncomfortable, but can cause the body core temperature of the occupant to increase during REM sleep, because the human body does not regulate body temperature during REM sleep.

Studies also indicate that selective application of heat in various areas of the bed occupant's body can affect blood flow, core body temperature, sleep staging, and other physiological conditions, both negatively and positively. It is therefore important to control the temperature in these regions. For example, some types of diseases will render body appendages insensitive to heat. Unheated, or reduced heat zones are typically necessary for these types of users.

In addition to control of temperature of the bed, it would be desired to detect the presence of an occupant in the bed. An occupant sensor would detect the presence of a person in the bed, and adjust the bed temperature accordingly. Occupant sensors could also be used for a wide variety of other operations, including the control of various devices about the home, air chambers adjustments (for air beds), various safety alarms, and other controls.

SUMMARY OF THE INVENTION

It is therefore a general object of the present invention to provide an improved temperature control apparatus for a bed.

Another object is to provide a temperature control apparatus which will adjust the temperature of individual regions of a bed, at selected time intervals.

Still another object is to provide a temperature control apparatus which is interconnected with an occupant sensor in the bed.

These and other objects will be apparent to those skilled in the art.

The temperature control apparatus for a bed of a present invention includes at least one heating element mounted in a resting surface on a mattress of the bed for warming at least a first area of the resting area. A temperature sensor is located to detect the temperature of the first area of the resting area, and transmits the information to a central control unit. The central control unit includes a central processing unit which is interconnected with both the heating element and the temperature sensor to adjust the temperature in the first area of the resting area as desired. The central control unit is also connected to a timer to permit programming of temperature changes as desired. An occupant sensor in the resting surface of the mattress will detect the presence and absence of an occupant, and transmit this information to the central control unit for processing.

DESCRIPTION OF THE PREFERRED EMBODIMENT

Figure 1:
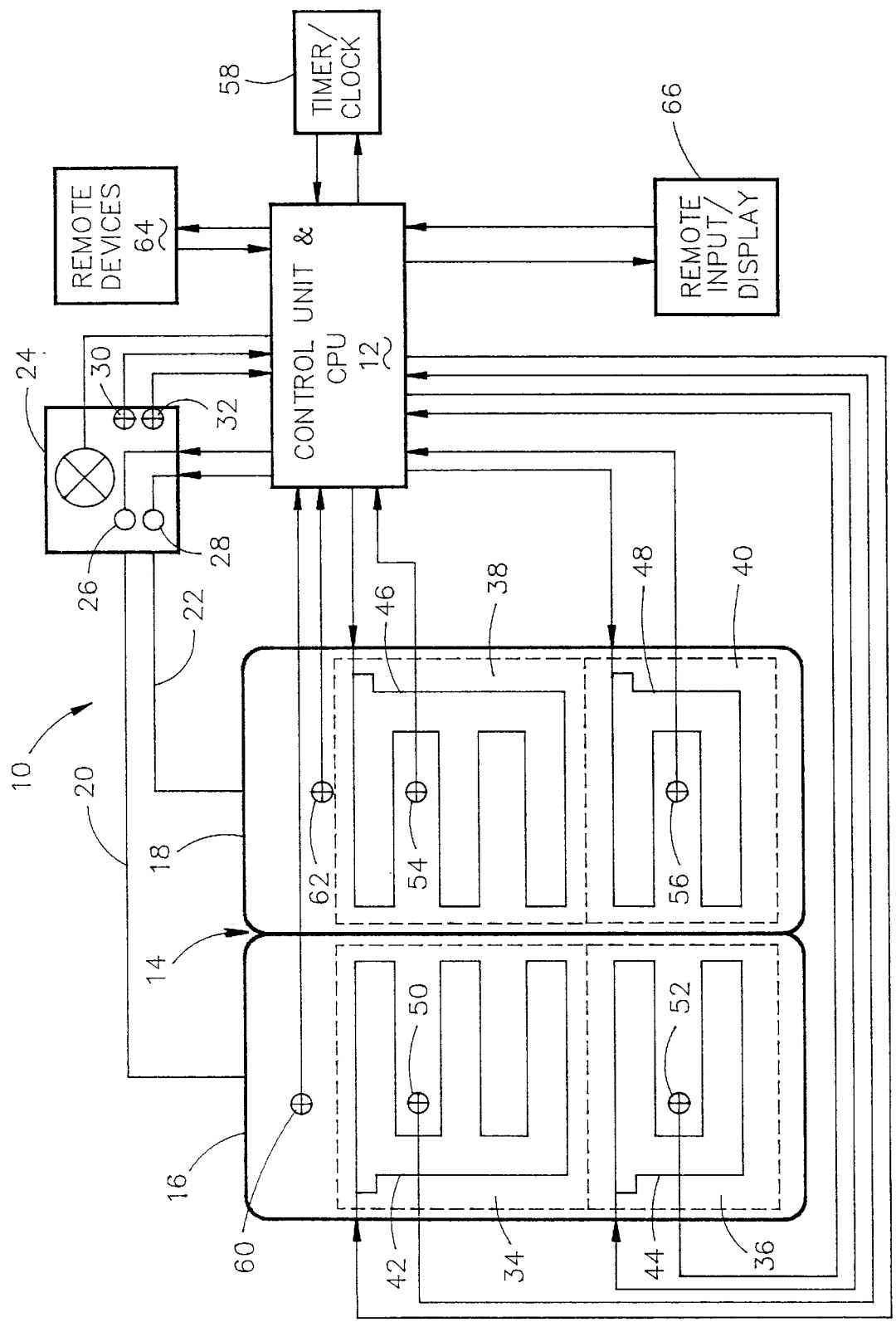
FIG. 1 is a schematic block diagram showing the interconnection of various sensors and heating units in a bed, with a control unit.

Referring now to the drawing, the temperature control apparatus of the present invention is designated generally at 10 and includes a central control unit 12, including a central processing unit for receiving, transmitting and processing information.

Temperature control apparatus 10 is utilized to control the temperature of a mattress 14, of any of a variety of types. For example, mattress 14 may be an air mattress, a waterbed mattress, or a conventional fiber/coil filled mattress. In the preferred embodiment of the invention, an air bed mattress will be described in detail.

Mattress 14 is divided into left and right independent fluid bladders 16 and 18, each bladder designed to support an individual occupant. Because the preferred embodiment of the invention discloses air mattresses, each bladder 16 and 18 has a pneumatic line 20 and 22 respectively connected to an air pump 24 via valves 26 and 28 respectively. Pressure sensors 30 and 32 transmit data regarding the pressure detected within each airline 20 and 22, and thus in each bladder 16 and 18, respectively, to control unit 12. Control unit 12 is connected to valves 26 and 28, to permit adjustment of the pressure within bladders 16 and 18, as needed.

Each bladder 16 and 18 is preferably divided into more than one heat zone. The drawing shows a central heat zone 34 and foot heat zone 36 on the upper surface of bladder 16, and a central heat zone 38 and foot heat zone 40 on the upper surface of bladder 18. Each heat zone 34, 36, 38 and 40 is heated by a heating element 42, 44, 46, and 48 respectively, which are individually connected to the control unit 12 for selective activation and control.

Each heat zone 34, 36, 38, and 40 also includes one temperature sensor 50, 52, 54, and 56 respectively, which are connected to control unit 12 to transmit information as to the temperature of the particular heat zone. Sensors 50, 52, 54, and 56 may be of any known variety such as a thermocouple, thermistor, infrared, or the like. Similarly, heating elements 42, 44, 46, and 48 may be of any conventional type, such as a waterbed heater mat, a heating element attached to a pillow top assembly, or a blanket having a heating element embedded therein.

A timer/clock 58 is interconnected to the control unit and CPU 12. Timer 58 would permit the occupant to set a timed delay for increasing or decreasing temperature, whether for initial "warm up" of the bed, heat set back, or an increase in temperature to assist in waking the occupant. The interconnection of timer 58 with the control unit and CPU 12 would also permit the CPU to measure actual increasing in temperature and then calculate a compensating value. In addition, there may be compensation for ambient temperature, whereby additional set back at an earlier time occurs as the ambient temperature increases. Less set back and potentially at a later time, for decreases in ambient temperature. Because an occupant's perception of temperature and temperature adaptability changes by season, the control unit and CPU 12 may be programmed for a seasonal adjusted set back or adjusted bed temperature.

Occupant sensors 60 and 62 are provided in each of bladders 16 and 18, to detect the presence of an occupant on one of bladders 16 or 18. Occupant sensors 60 and 62 are generally utilized to detect the presence or absence of a person on each bladder 16 and 18. The sensors may be of any conventional variety pressure, ultrasonic, temperature, capacitive, infrared, motion, mechanical switches, strain gages, or any similar or equivalent apparatus.

Occupant sensors 60 and 62 are interconnected to the control unit and CPU 12 to permit the control unit to adjust the pressure in the air chamber when the bed is unoccupied, via pump 24 and valves 26 and 28. This would permit the bed to be pumped up to the predetermined pressure setting while the occupant is away from the bed, to avoid waking the occupant with air pump noise. Since the timer 58 is also interconnected with the control unit 12, the raising or lowering of the temperature within a heat zone may be adjusted based upon a time delay from when an occupant either occupies or leaves the bed. For example, the control unit 12 could turn off the heating elements 42, 44, 46, and 48 when one or both sides of the bed are unoccupied. The timer would permit a time delay before turning off the heating devices, to permit the occupant to leave and return to the bed within a predetermined amount of time.

In addition to detecting the presence and absence of an occupant, the occupant sensors 60 and 62 may include sensors for detecting the body core temperature of the occupant. Various apparatus are available to form this function, including contacts which measure skin temperature at various locations and which then process the various skin temperatures to determine body core temperature. Other devices which are less invasive are also available for use in determining the body core temperature of the occupant. Each of these devices is connected to the control unit, to permit adjustment of the bed temperature based upon the body core temperature of the occupant.

Similarly, the heating elements can be automatically activated if the occupant enters the bed at a non-scheduled time, thereby overriding a temperature set back.

Various remote devices 64 may be interconnected with control unit and CPU 12, either directly, or by transceivers or the like, to permit control of the wide variety of apparatus by the control unit and CPU 12. For example, control unit 12 could be utilized to activate or deactivate a television, a radio, lights, security or alarms, household heat and cooling systems, dishwashers, or the like. These devices could be set to either activate upon an occupant being detected on bed 14, or to activate upon detection of an occupant leaving bed 14. The CPU 12 could also be utilized to track use patterns of the occupant and set appliances and other apparatus accordingly. More specifically, when an occupant goes to bed, the control unit 12 could be programmed to start the dishwasher, start the television 30 minute timer, set back the bed temperature, arm a security alarm, lower the temperature of the house or room heating system, set an alarm clock, set a telephone to "no ring", switch the household lights to predetermined on/off pattern, or other similar activities. When the occupant arises, the alarm clock can be turned off, the television turned on, the coffee started, the lights turned on or off, etc., by control unit 12. In fact, control unit 12 could activate an air pump when the occupants are detected as leaving the bed, to inflate chambers in a special pillow top assembly which causes the pillow top assembly to extend to its full dimensions, thereby facilitating "making" the bed.

Finally, a remote input/display unit 66 is interconnected with control unit and CPU 12, to permit the programming of the control unit and CPU from any remote location, as well as to display the current settings and conditions of devices controlled by control unit 12.

Whereas the invention has been shown and described in connection with the preferred embodiment thereof, many modifications, substitutions and additions may be made which are within the intended broad scope of the appended claims.

I claim:

1. A temperature control apparatus for controlling the temperature of a resting surface on a mattress of a bed, comprising:

at least a first heating element in the resting surface for warming a first area of the resting surface;

a central control unit;

at least a first temperature sensor in said resting surface for sensing the temperature of the first area of the resting surface, and transmitting the information to said central control unit;

said central control unit having a central processing unit interconnected with said first heating element and said first temperature sensor for receiving information from said first temperature sensor and selectively operating said first heating element to raise and lower the temperature in the first area to a predetermined temperature;

a timer operatively connected to said control unit, and an occupant sensor in the resting surface connected to said control unit for sensing the presence of a person on the resting surface;

said central control unit being programmed to change the temperature of the first area after a first predetermined time period, said first predetermined time period being initiated upon said central control unit receiving information from said occupant sensor indicating the presence of a person on the resting surface.

2. The apparatus of claim 1, further comprising:

a second heating element in the resting surface for warming a second area of the resting surface; and a second temperature sensor in said resting surface for detecting the temperature of the second surface of the resting area and transmitting the information to the central control unit;

said second heating element and said second sensor interconnected with the control unit, the sensor transmitting information to the control unit, and the second heating element operated by the control unit to warm the second area to a predetermined temperature after the first and second predetermined time periods.

3. The apparatus of claim 2, wherein said control unit is in operable communication with remote devices, for selectively activating and deactivating the remote devices in response to information transmitted from one or more of the timer and occupant sensors.

4. The apparatus of claim 3, wherein the mattress is an air filled bladder, and further comprising:

a pneumatic line communicating between the bladder and an air pump;

said air pump connected to the control unit for selective operation by the control unit; and a valve in the pneumatic line, connected to and selectively operated by the control unit, to selectively permit air flow from the pump to the bladder.

5. The apparatus of claim 4, further comprising a pressure sensor interposed in the pneumatic line and interconnected with the control unit to transmit pressure information to the control unit.

6. The apparatus of claim 5, further comprising means on said mattress for measuring the body core temperature of an occupant on the bed, said measuring means connected to the control unit, and said control unit programmed to adjust the temperature of the first area in response to the occupant's body core temperature.

7. The apparatus of claim 1, wherein said control unit is in operable communication with remote devices, for selectively activating and deactivating the remote devices in response to information transmitted from one or more of the timer and occupant sensors.

8. The apparatus of claim 1, wherein the mattress is an air filled bladder, and further comprising:

a pneumatic line communicating between the bladder and an air pump;

said air pump connected to the control unit for selective operation by the control unit; and a valve in the pneumatic line, connected to and selectively operated by the control unit, to selectively permit air flow from the pump to the bladder.

9. The apparatus of claim 8, further comprising a pressure sensor interposed in the pneumatic line and interconnected with the control unit to transmit pressure information to the control unit.

10. The apparatus of claim 1, further comprising measuring means on said mattress for measuring the body core temperature of an occupant on the bed, said measuring means connected to the control unit, and said control unit programmed to adjust the temperature of the first area in response to the occupant's body core temperature.

* * * * *